(12) United States Patent
Young et al.

(10) Patent No.: US 12,158,225 B2
(45) Date of Patent: Dec. 3, 2024

(54) SWIVEL JOINT

(71) Applicant: METER ENGINEERS, INC., Kechi, KS (US)

(72) Inventors: William Bradley Young, Benton, KS (US); Jacob Deffenbaugh, Wichita, KS (US)

(73) Assignee: METER ENGINEERS, INC., Kechi, KS (US)

( * ) Notice: Subject to any disclaimer, the term of this patent is extended or adjusted under 35 U.S.C. 154(b) by 0 days.

(21) Appl. No.: 17/946,852

(22) Filed: Sep. 16, 2022

(65) Prior Publication Data

US 2023/0090899 A1 Mar. 23, 2023

Related U.S. Application Data

(60) Provisional application No. 63/245,397, filed on Sep. 17, 2021.

(51) Int. Cl.
*F16L 27/10* (2006.01)
*F16L 27/08* (2006.01)

(52) U.S. Cl.
CPC ....... *F16L 27/1012* (2013.01); *F16L 27/0824* (2013.01); *F16L 2201/30* (2013.01)

(58) Field of Classification Search
CPC ............... F16L 27/1012; F16L 27/0824; F16L 2201/30; F16L 27/0808; F16L 27/08
USPC ................................. 285/278, 280, 281, 415
See application file for complete search history.

(56) References Cited

U.S. PATENT DOCUMENTS

| | | | | |
|---|---|---|---|---|
| 1,746,036 A | * | 2/1930 | Gray | E21B 21/02 285/94 |
| 1,959,823 A | * | 5/1934 | Greve | E21B 21/02 403/147 |
| 2,088,418 A | * | 7/1937 | King | E21B 21/02 285/275 |
| 2,817,543 A | * | 12/1957 | Corsette | F16L 27/0824 285/98 |
| 3,177,012 A | * | 4/1965 | Faccou | F16L 27/0832 285/94 |

(Continued)

OTHER PUBLICATIONS

Product Sheet, TMI, Engineering Specifications, "TM Swivel Joints", 2018, 1 pg.

(Continued)

*Primary Examiner* — David Bochna
(74) *Attorney, Agent, or Firm* — STINSON LLP (57) ABSTRACT

A swivel joint including a flange assembly and an inner joint that is configured to rotate with respect to the flange assembly. The flange assembly may include a first flange and a second flange that is secured to the first flange. The inner joint may have a main body and a radial extension extending outward from the main body with the radial extension positioned between the first flange and the second flange. A first thrust bearing may be positioned between the radial extension and the first flange, and a second thrust bearing may be positioned between the radial extension and the second flange. A first seal and a second seal may each be positioned between the flange assembly and the inner joint. A leak indicator may be positioned between the first seal and the second seal. The first and second thrust bearings may be caged bearings.

16 Claims, 9 Drawing Sheets

(56) References Cited

U.S. PATENT DOCUMENTS

| | | | | |
|---|---|---|---|---|
| 3,446,542 | A | * | 5/1969 | Rufus .................. F16C 35/045 |
| | | | | 384/477 |
| 4,205,866 | A | * | 6/1980 | McCracken ........ F16L 27/0832 |
| | | | | 285/94 |
| 4,449,739 | A | * | 5/1984 | Raether .............. F16L 27/0824 |
| | | | | 285/98 |
| 4,462,617 | A | * | 7/1984 | Green ................. F16L 27/0824 |
| | | | | 285/94 |
| 4,478,438 | A | * | 10/1984 | Elorriaga, Jr. ...... F16L 27/0812 |
| | | | | 285/94 |
| 4,995,457 | A | * | 2/1991 | Baldridge ........... F16L 27/0824 |
| | | | | 15/104.062 |
| 2003/0071141 | A1 | * | 4/2003 | Rieben ................ F16L 27/0824 |
| | | | | 239/225.1 |
| 2004/0051312 | A1 | * | 3/2004 | Haviland ................ F16L 27/08 |
| | | | | 285/276 |
| 2011/0042936 | A1 | * | 2/2011 | Andrews ............. F16L 27/0832 |
| | | | | 285/94 |
| 2017/0097046 | A1 | * | 4/2017 | Hadden ................. F16C 23/084 |
| 2020/0370595 | A1 | * | 11/2020 | Dent ..................... F16C 33/585 |

OTHER PUBLICATIONS

Product Sheet, TMI, Packing and Component Parts, "TM Swivel Joints", 2018, 1 pg.
Product Sheet, TMI, Replacement Parts, "TM Swivel Joints", 2018, 1 pg.
Product Sheet, TMI, Fabricated, "TM Swivel Joints", 2018, 1 pg.
Product Sheet, TMI, Flanged, "TM Swivel Joints", 2018, 1 pg.
Product Sheet, TMI, Threaded, Bored for Weld, Beveled for Weld, "TM Swivel Joints", 2018, 1 pg.
Product Sheet, TMI, Styles, "TM Swivel Joints", 2018, 1 pg.
Product Sheet, TMI, The Original, "TM Swivel Joints", 2018, 1 pg.
Product catalog, OPW Engineered Systems, "Swivel Joints Catalog", 2020 (24 pgs).
Product Catalog, FMC Corporation, "Chiksan® Original Swivel Joints", 1997 (16 pgs).
Product Sheet, EMCO Wheaton, "D2000—PTFE/Swivel Joint", Aug. 2020, 2 pgs.
Product Sheet, EMCO Wheaton, "D1133/Swivel Joint", Aug. 2020, 2 pgs.
Product Catalog, Dixon®, "Swivel Joints", 1997, 44 pgs.

* cited by examiner

SWIVEL JOINT

CROSS-REFERENCE TO RELATED APPLICATIONS

This application is based on and claims priority to U.S. Provisional Application Ser. No. 63/245,397, filed on Sep. 17, 2021, which is incorporated herein by reference in its entirety.

STATEMENT REGARDING FEDERALLY SPONSORED RESEARCH OR DEVELOPMENT

Not applicable.

STATEMENT REGARDING JOINT RESEARCH AGREEMENT

Not applicable.

BACKGROUND OF THE INVENTION

1. Field of the Invention

The invention relates to a swivel joint that may be used, for example, in a fluid distribution system.

2. Description of Related Art

A swivel joint is used to connect two conduits (e.g., pipes or hoses) in a fluid distribution system to prevent twisting of a hose or when it is otherwise necessary or desirable to allow the conduits to rotate with respect to each other. While there are many different types of swivel joints that are commercially available, many conventional swivel joints do not rotate easily when they are conveying a high pressure fluid. Swivel joints also typically include at least two parts that rotate with respect to each other and a seal positioned between the two parts. If the seal fails while the swivel joint is in service, fluid leaks out of the swivel joint. If the fluid is environmentally hazardous, the leaked fluid may be time-consuming and expensive to clean. Further, many conventional swivel joints are difficult to service and maintain. For example, if a seal or a bearing needs to be replaced, the entire swivel joint may need to be disassembled to replace the seal or bearing and then reassembled. Because many conventional swivel joints include loose ball bearings, it can be time-consuming to disassemble and reassemble a swivel joint.

BRIEF SUMMARY OF THE INVENTION

A swivel joint in accordance with an exemplary embodiment of the invention described herein includes a first flange, a second flange that is secured to the first flange, and an inner joint that is configured to rotate with respect to the first flange and the second flange. The inner joint has a main body and a radial extension extending outward from the main body. The radial extension is positioned between the first flange and the second flange. A first thrust bearing is positioned between the radial extension and the first flange, and a second thrust bearing is positioned between the radial extension and the second flange.

In some embodiments, a third thrust bearing is positioned between the radial extension and the second flange, and the second thrust bearing and the third thrust bearing are each semiannular. Further, the second flange may have a first section and a second section that are removably coupled to each other with the second thrust bearing positioned between the radial extension and the first section of the second flange, and the third thrust bearing positioned between the radial extension and the second section of the second flange.

In some embodiments, the swivel joint includes a first washer positioned between the first thrust bearing and the first flange, a second washer positioned between the first thrust bearing and the inner joint, a third washer positioned between the second thrust bearing and the inner joint, and a fourth washer positioned between the second thrust bearing and the second flange.

In some embodiments, the swivel joint includes a journal bearing positioned between the main body of the inner joint and the first flange.

In some embodiments, the main body of the inner joint and the first flange define a passageway configured to allow fluid to flow through it. The first thrust bearing may include a plurality of spaced apart cylindrical rollers each supported by a cage. The cylindrical rollers may be oriented so that a longitudinal axis of each roller is positioned perpendicular to the passageway. The swivel joint may further include a first seal positioned between the first flange and the inner joint, a second seal positioned between the first flange and the inner joint, and a leak indicator positioned between the first seal and the second seal. The first seal may be an o-ring seal with an outer surface comprising at least one of polytetrafluoroethylene (PTFE), perfluoroalkoxy (PFA), or fluorinated ethylene propylene (FEP). The first seal and the second seal may be configured so that the second seal is exposed to fluid flowing through the passageway when the first seal fails. The leak indicator may include a housing coupled to the first flange and a piston slidably received in the housing. The piston is biased to a first position and exposed to a chamber positioned between the first seal and the second seal. The piston is configured to move from the first position to the second position when the first seal fails and fluid from the passageway enters the chamber.

A swivel joint in accordance with another exemplary embodiment of the invention described herein includes a flange assembly and an inner joint that is configured to rotate with respect to the flange assembly. A first seal and a second seal are each positioned between the flange assembly and the inner joint. A leak indicator is positioned between the first seal and the second seal. The first seal may be an o-ring seal with an outer surface including at least one of PTFE, PFA, or FEP. The inner joint and the flange assembly may define a passageway configured to allow fluid to flow through it. The first seal and the second seal may be configured so that the second seal is exposed to fluid flowing through the passageway when the first seal fails. The leak indicator may include a housing coupled to the flange assembly and a piston slidably received in the housing. The piston may be biased to a first position and exposed to a chamber positioned between the first seal and the second seal. The piston may be configured to move from the first position to the second position when the first seal fails and fluid from the passageway enters the chamber.

Another exemplary embodiment of swivel joint in accordance with the invention described herein includes a flange assembly, an inner joint that is configured to rotate with respect to the flange assembly, and a caged bearing positioned between the flange assembly and the inner joint. The caged bearing may have a plurality of spaced apart rollers or balls each supported by a cage. The flange assembly may include a first flange and a second flange that is secured to the first flange. The inner joint may have a main body and a radial extension extending outward from the main body with the radial extension positioned between the first flange and the second flange. The caged bearing may be a thrust bearing positioned between the radial extension and either the first flange or the second flange. The caged bearing may be positioned between the radial extension and the first flange, and the swivel joint may have a second thrust bearing positioned between the radial extension and the second flange. A journal bearing may be positioned between the main body of the inner joint and the first flange.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

A swivel joint in accordance with an exemplary embodiment of the invention described and claimed herein is identified generally as 10 in FIGS. 1-6. As described in more detail below, the swivel joint 10 is configured for use in a fluid distribution system and allows two components of the fluid distribution system to rotate with respect to each other. For example, the swivel joint 10 has a flange assembly 12 and an inner joint 14 that is configured to rotate with respect to the flange assembly 12. A passageway 16 defined by the flange assembly 12 and inner joint 14 is configured to convey a fluid from one component of the fluid distribution system to another component of the fluid distribution system. For example, the flange assembly 12 may be joined to a first conduit (e.g., a hose) of the fluid distribution system, and the inner joint 14 may be joined to a second conduit (e.g., a pipe) of the fluid distribution system. The swivel joint 10 allows the flange assembly 12 and first conduit to rotate with respect to the inner joint 14 and second conduit about a central axis 18 (FIGS. 1 and 4) of the passageway 16 as a relatively high pressure fluid flows through the passageway 16.

Figure 1:
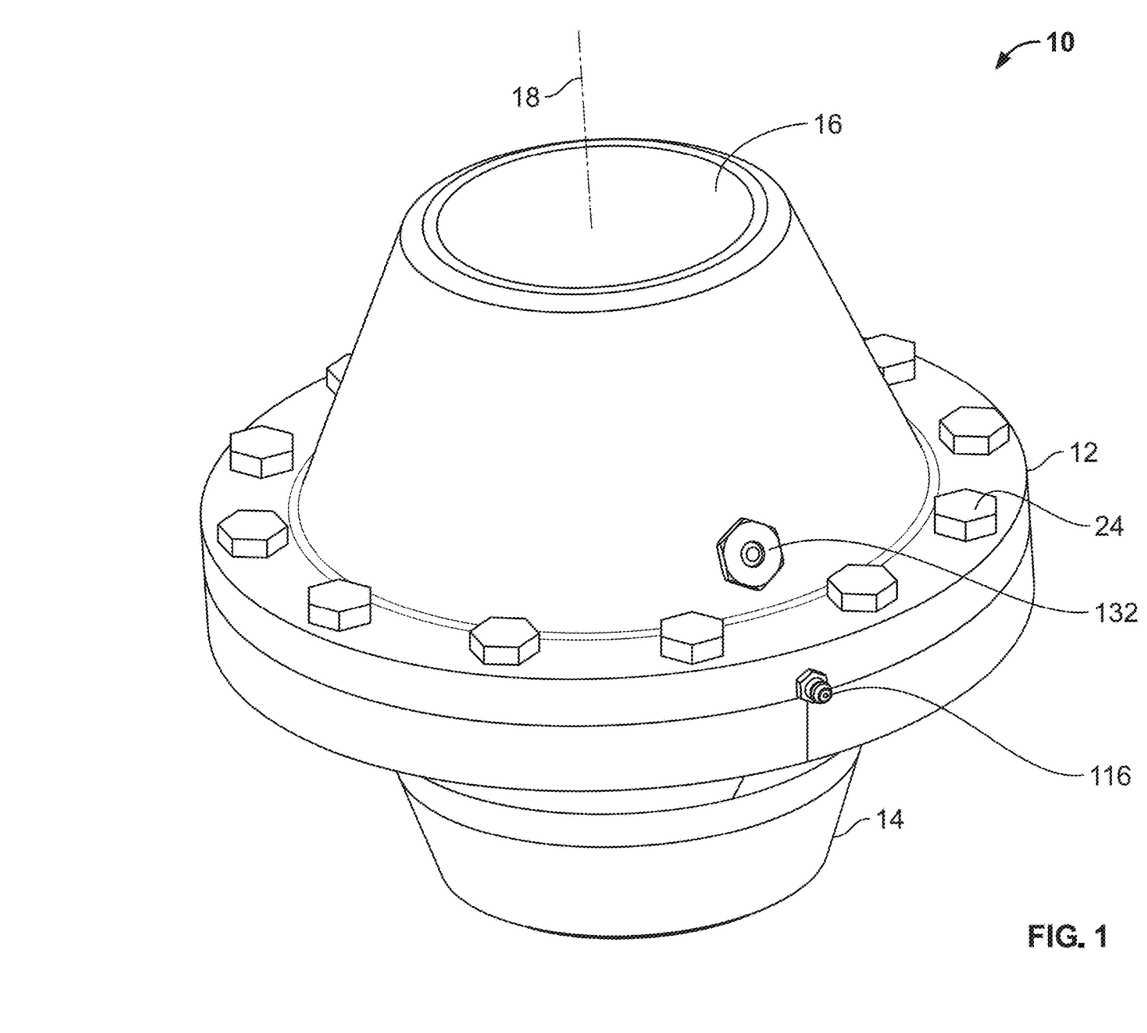
FIG. 1 is a top perspective view of a swivel joint in accordance with one embodiment of the invention described herein.
Figure 2:
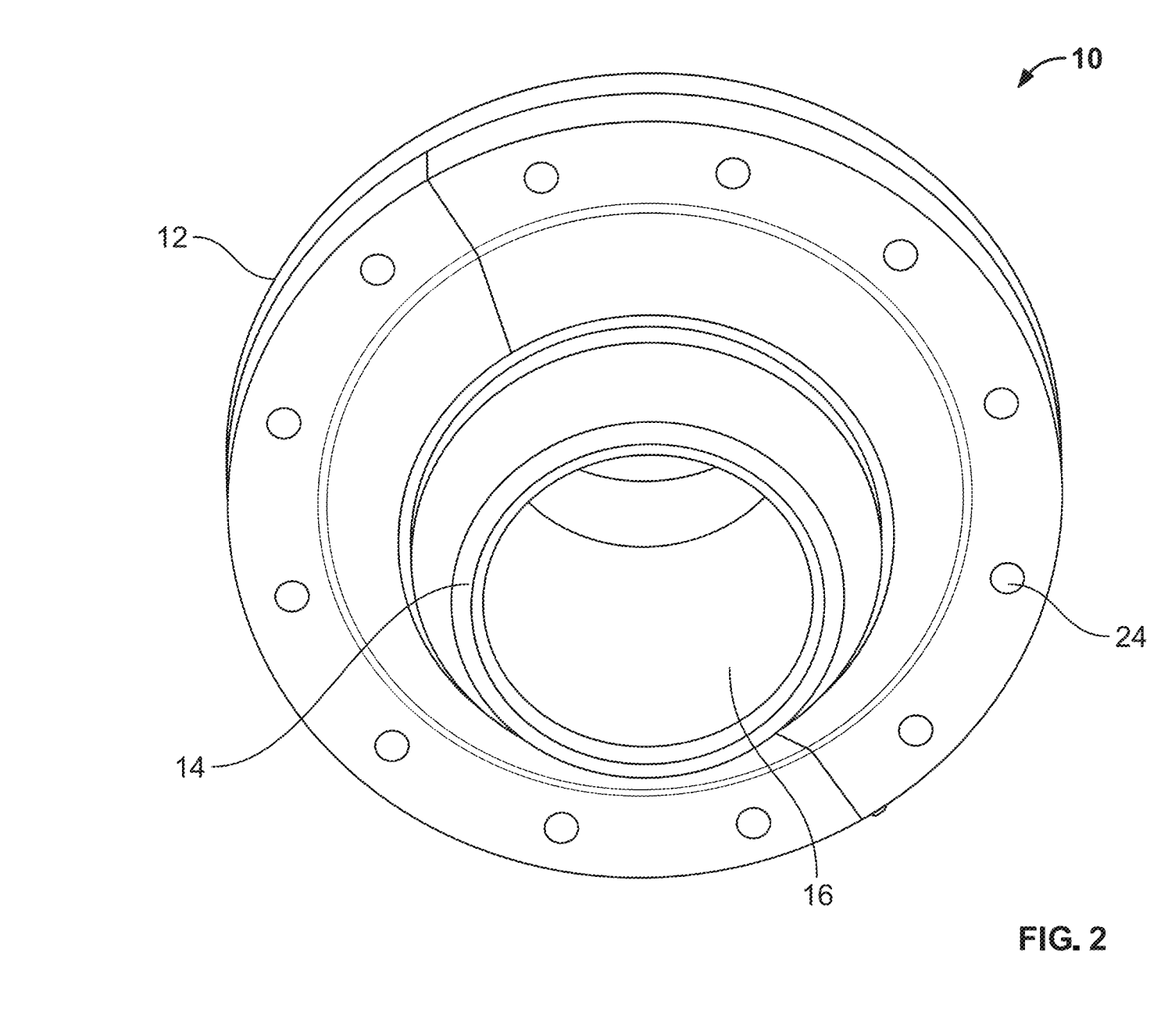
FIG. 2 is a bottom perspective view of the swivel joint shown in FIG. 1.
Figure 3:
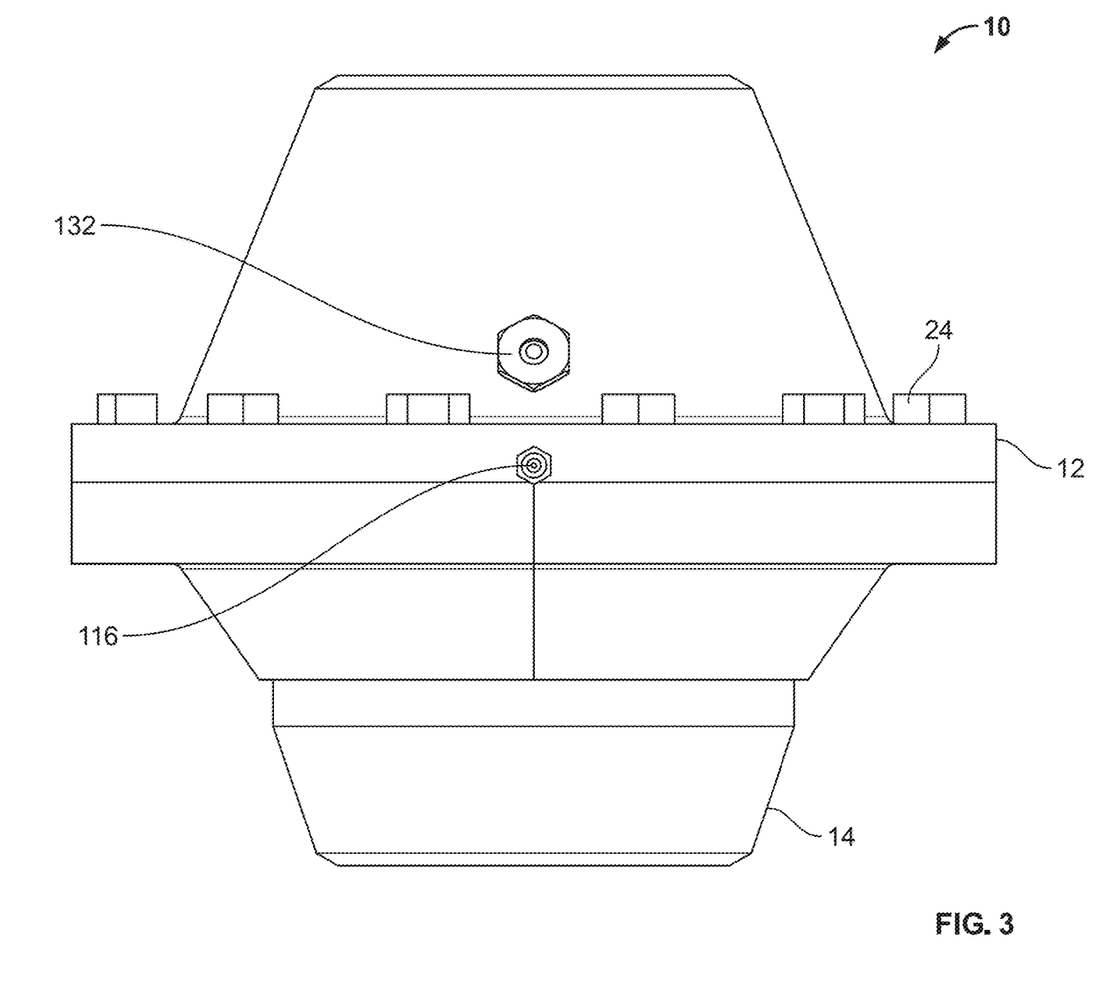
FIG. 3 is a front elevational view of the swivel joint shown in FIG. 1.
Figure 4:
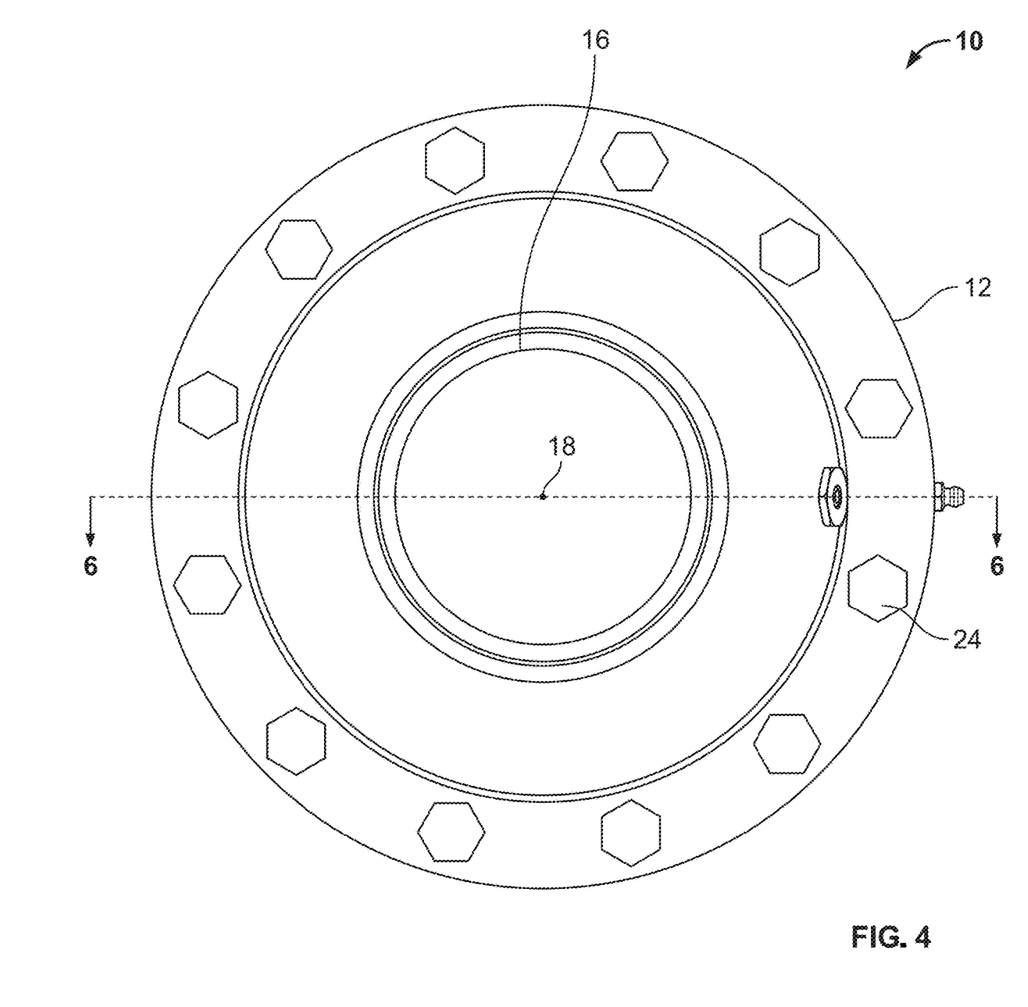
FIG. 4 is a top plan view of the swivel joint shown in FIG. 1.
Figure 5:
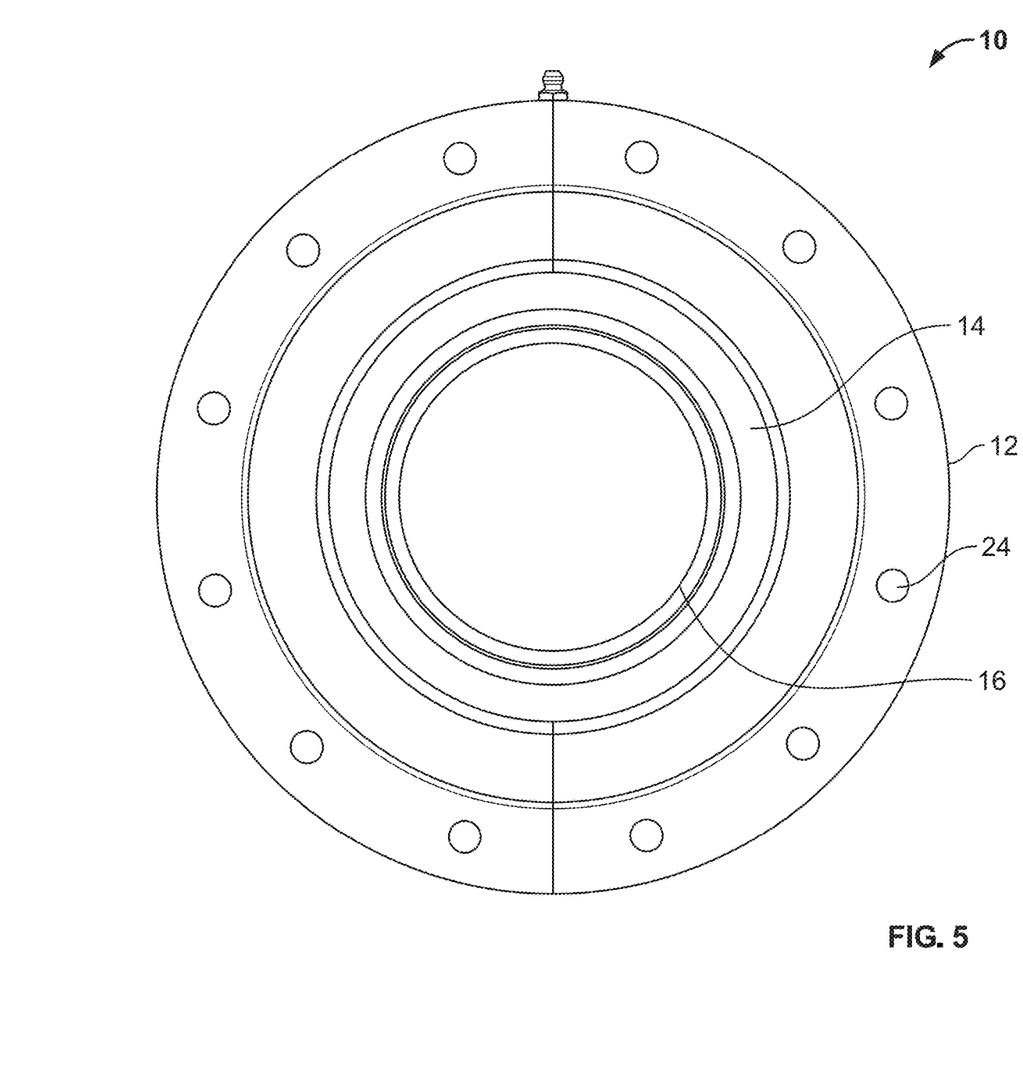
FIG. 5 is a bottom plan view of the swivel joint shown in FIG. 1.
Figure 6:
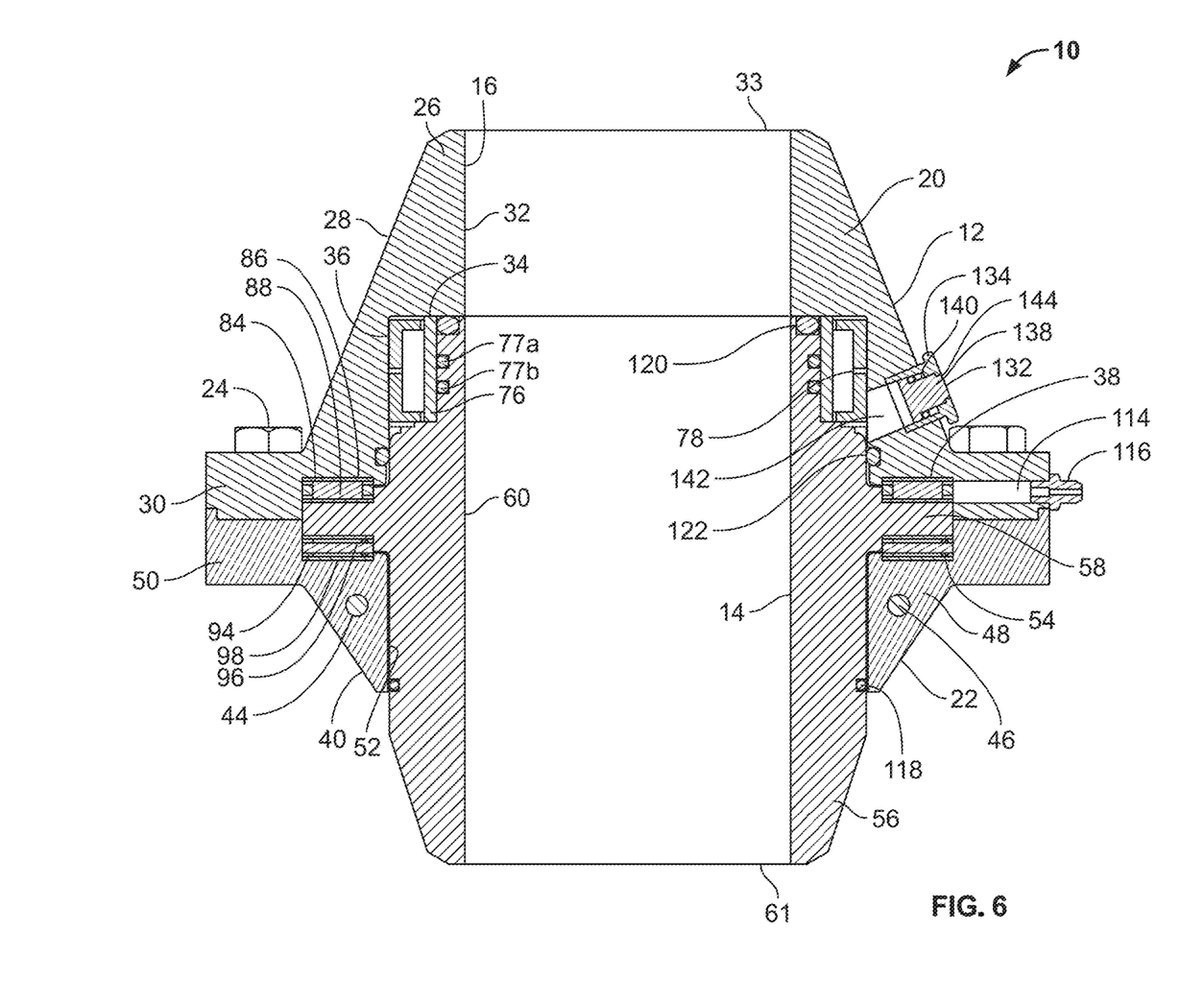
FIG. 6 is a cross-sectional view taken through the line 6-6 in FIG. 4.

As shown in FIG. 6, the flange assembly 12 includes a first flange 20 and a second flange 22 that are secured together with fasteners, one of which is identified as 24. The fasteners 24 extend through aligned openings of the first and second flanges 20, 22. The fasteners 24 may be bolts with threaded surfaces each engaging a threaded surface surrounding an opening in the second flange 22. The first flange 20 has a main section 26 with an outer surface 28 shaped as a truncated cone. A flange portion 30 extends radially outward from the base of the outer surface 28. The passageway 16 is partially defined by an inner surface 32 of the main section 26. An opening 33 at an end of the first flange 20 leads into the passageway 16. A conduit of a fluid distribution system (not shown) may be welded to the first flange 20 so that the conduit is in fluid communication with the passageway 16 through the opening 33. Alternatively, a conduit may be joined to the first flange 20 in another manner that places it in fluid communication with the passageway 16 through the opening 33. The inner surface 32 is cylindrical. An annular sealing surface 34 extends radially outward from the inner surface 32, and a cylindrical bearing surface 36 extends vertically downward from the sealing surface 34. An annular bearing surface 38 extends radially outward from the cylindrical bearing surface 36, and the flange portion 30 extends radially outward from the annular bearing surface 38.

Figure 8:
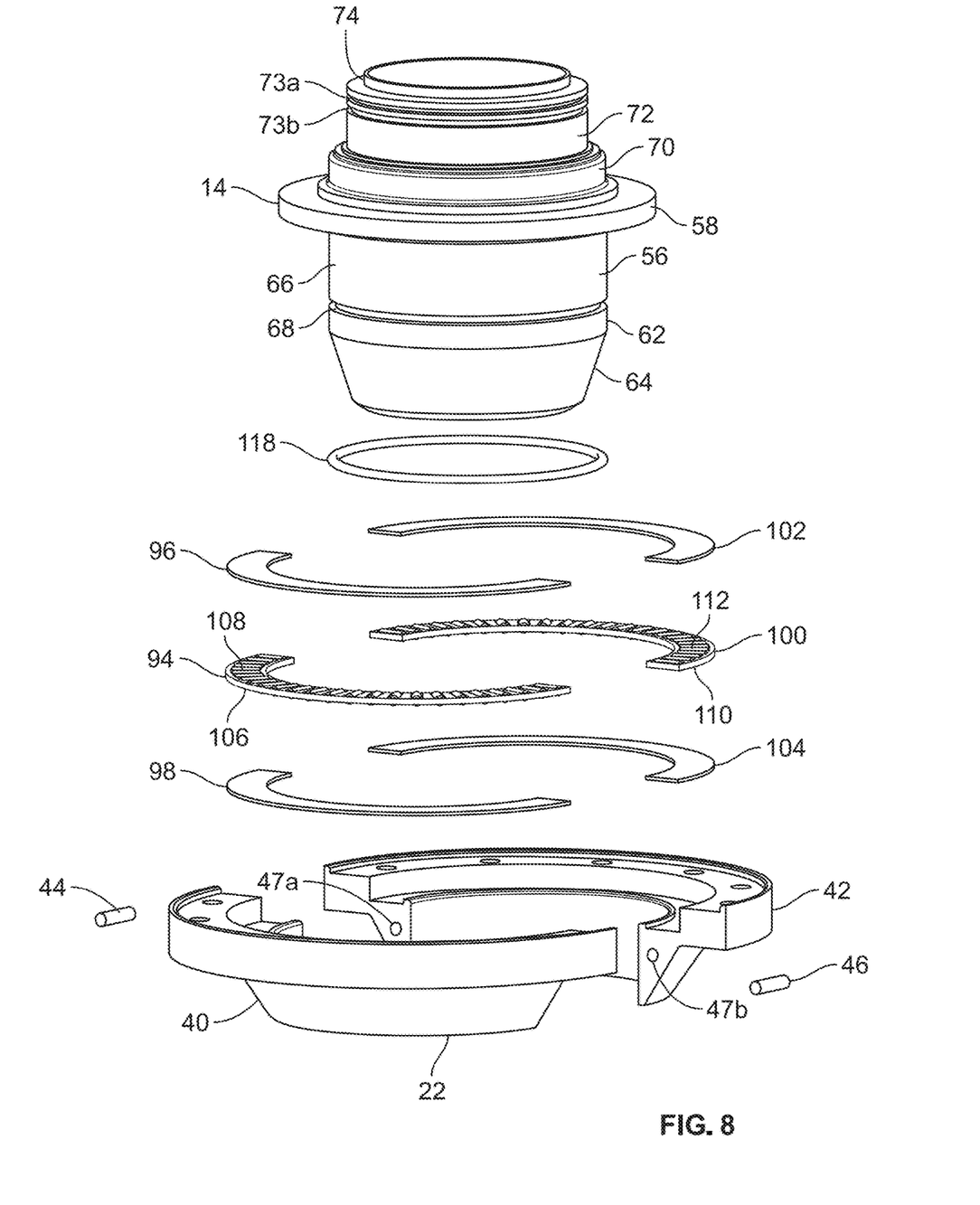
FIG. 8 is an exploded view of a lower portion of the swivel joint shown in FIG. 1.

As best shown in FIG. 8, the second flange 22 includes a first section 40 and a second section 42 that are removably joined together with dowel pins 44 and 46. The dowel pins 44, 46 are received by openings 47a-b, respectively, of the second section 42 and similar aligned openings (not shown) of the first section 40. Dividing the second flange 22 into first and second sections 40 and 42 that are removably coupled together may assist in removing the second flange 22 for maintenance of the swivel joint 10, as described in more detail below. Referring to FIG. 6, the second flange 22 has a main body 48 and a flange portion 50 that extends radially outward from an upper end of the main body 48. The flange portion 50 is sized and configured to mate with the flange portion 30 of the first flange 20. An inner surface 52 of the main body 48 is sized and configured to receive a portion of the inner joint 14. A bearing surface 54 extends radially outward from the inner surface 52, and the flange portion 50 extends radially outward from the bearing surface 54. In at least some embodiments of the swivel joint 10 described herein, the second flange 22 may be a single integrated part not divided into first and second sections 40 and 42.

The inner joint 14 has a main body 56, which is generally tubular, and a radial extension 58 extending radially outward from the main body 56. The radial extension 58 is positioned between the first flange 20 and the second flange 22. The passageway 16 is partially defined by an inner surface 60 of the main body 56. An opening 61 at an end of the inner joint 14 leads into the passageway 16. A conduit of a fluid distribution system (not shown) may be welded to the inner joint 14 so that the conduit is in fluid communication with the passageway 16 through the opening 61. Alternatively, a conduit may be joined to the inner joint 14 in another manner that places it in fluid communication with the passageway 16 through the opening 61. The inner surface 60 is cylindrical. As shown in FIG. 8, an outer surface 62 of the main body 56 has a lower, tapered section 64 and a cylindrical section 66 extending between the tapered section 64 and the radial extension 58. An annular groove 68 extends around a portion of the cylindrical section 66. Above the radial extension 58, the outer surface 62 includes a sealing surface 70 and a bearing surface 72 of lesser diameter than the sealing surface 70. Two grooves 73a-b formed in the bearing surface 72 receive o-ring seals, as described in more detail below. The outer surface 62 also includes another sealing surface 74 positioned above the bearing surface 72 and having a diameter that is less than the bearing surface 72.

Figure 7:
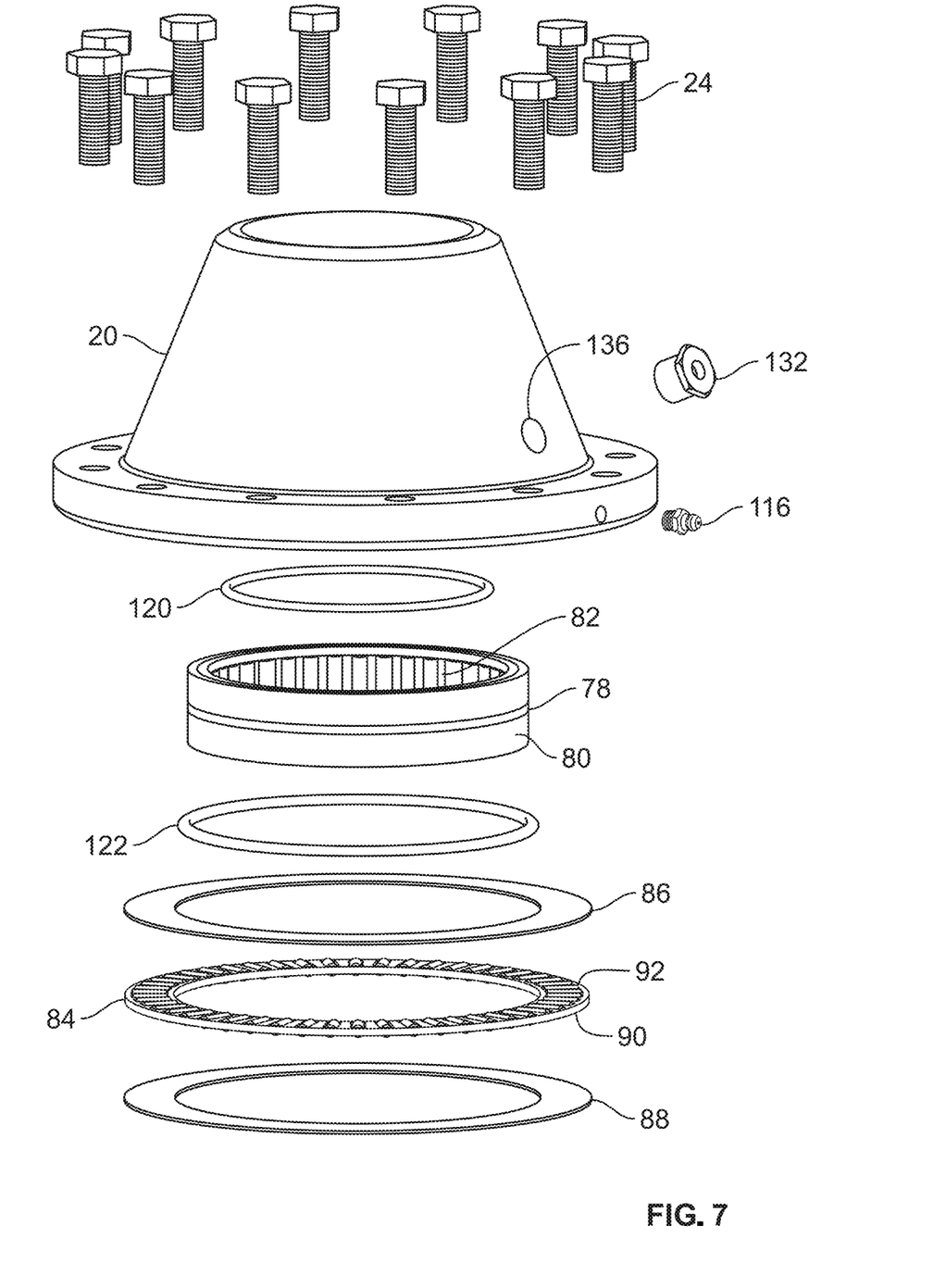
FIG. 7 is an exploded view of an upper portion of the swivel joint shown in FIG. 1.

Referring back to FIG. 6, a journal bearing race 76 is positioned around the bearing surface 72 of the main body 56 of the inner joint 14, and a journal bearing 78 is positioned between the journal bearing race 76 and the bearing surface 36 of the first flange 20. Two o-ring seals 77a-b are positioned in the grooves 73a-b (FIG. 8) to seal between the bearing surface 72 and the journal bearing race 76. As shown in FIG. 7, the journal bearing 78 is a caged bearing with an annular cage 80 that retains a plurality of spaced apart cylindrical rollers, one of which is identified as 82. The rollers are oriented with a longitudinal axis that extends in the same direction as the central axis 18 of the passageway 16, which is the rotational axis of the swivel joint 10. The journal bearing 78 carries radial loads in a direction perpendicular to the central axis 18 and torque loads of the swivel joint 10. While the journal bearing 78 is shown and described as a caged bearing with cylindrical rollers, in at least some embodiments of the invention described herein, the journal bearing 78 may be another type of bearing such as a caged bearing with balls. The journal bearing 78 and journal bearing race 76 may be retained on the inner joint 14 during assembly of the swivel joint 10.

As shown in FIG. 6, a first thrust bearing 84 is positioned between the radial extension 58 of the inner joint 14 and the bearing surface 38 of the first flange 20. A first washer 86 is positioned between the first thrust bearing 84 and the bearing surface 38, and a second washer 88 is positioned between the first thrust bearing 84 and the radial extension 58 of the inner joint 14. As shown in FIG. 7, the first thrust bearing 84 is a caged bearing with an annular cage 90 that retains a plurality of spaced apart cylindrical rollers, one of which is identified as 92. The rollers are oriented with a longitudinal axis that extends perpendicular to the central axis 18 of the passageway 16, or rotational axis of the swivel joint 10. The first thrust bearing 84 carries axial loads in a direction aligned with the central axis 18 and torque loads of the swivel joint 10.

Referring to FIG. 6, a second thrust bearing 94 is positioned between the radial extension 58 of the inner joint 14 and the bearing surface 54 of the second flange 22. A third washer 96 is positioned between the second thrust bearing 94 and the radial extension 58, and a fourth washer 98 is positioned between the second thrust bearing 94 and the bearing surface 54 of the second flange 22. As shown in FIG. 8, the second thrust bearing 94, third washer 96, and fourth washer 98 are semiannular. A third thrust bearing 100, fifth washer 102, and sixth washer 104 are also semiannular and are placed side-by-side with the second thrust bearing 94, third washer 96, and fourth washer 98, respectively, to form in combination an annular shaped thrust bearing with washers that is divided into two sections. The third thrust bearing 100 is positioned between the radial extension 58 of the inner joint 14 and the bearing surface 54 of the second flange 22. The fifth washer 102 is positioned between the third thrust bearing 100 and the radial extension 58, and the sixth washer 104 is positioned between the third thrust bearing 100 and the bearing surface 54 of the second flange 22. The second thrust bearing 94, third washer 96, and fourth washer 98 are positioned between the radial extension 58 and the first section 40 of the second flange 22, and the third thrust bearing 100, fifth washer 102, and sixth washer 104 are positioned between the radial extension 58 and the second section 42 of the second flange 22. In at least some embodiments of the swivel joint 10 described herein, the second thrust bearing 94, third washer 96, and fourth washer 98 may be annular and the third thrust bearing 100, fifth washer 102, and sixth washer 104 may be omitted.

As shown in FIG. 8, the second thrust bearing 94 is a caged bearing with a semiannular cage 106 that retains a plurality of spaced apart cylindrical rollers, one of which is identified as 108. The third thrust bearing 100 is also a caged bearing with a semiannular cage 110 that retains a plurality of spaced apart cylindrical rollers, one of which is identified as 112. The rollers 108, 112 are oriented with a longitudinal axis that extends perpendicular to the central axis 18 of the passageway 16, or rotational axis of the swivel joint 10. The second and third thrust bearings 94, 100 carry axial loads in a direction aligned with the central axis 18 and torque loads of the swivel joint 10.

While the first, second, and third thrust bearings 84, 94, and 100 are shown and described as caged bearings with cylindrical rollers, in at least some embodiments of the invention described herein, the first, second, and third thrust bearings 84, 94, and 100 may be another type of bearing such as a caged bearing with balls. The first, second, and third thrust bearings 84, 94, and 100 may be retained on the inner joint 14 during assembly of the swivel joint 10.

The journal bearing 78, first thrust bearing 84, second thrust bearing 94, and third thrust bearing 100 allow the inner joint 14 and flange assembly 12 to rotate with respect to each other as a high pressure fluid is conveyed through the passageway 16. The washers 86, 88, 96, 98, 102, and 104 may be formed from hardened steel for durability. Further, the fasteners 24 may be torqued to preload the first, second, and third thrust bearings 84, 94, and 100 between the flange assembly 12 and the inner joint 14 with an axial force.

As shown in FIG. 6, a chamber 114 defined by the first flange 20 extends radially outward from the first thrust bearing 84 through the flange portion 30. A grease zerk 116 threadingly engages the first flange 20 and is in fluid communication with the chamber 114. The grease zerk 116 may be used to lubricate the first thrust bearing 84, second thrust bearing 94, and third thrust bearing 100.

Further as shown in FIG. 6, a seal 118 is positioned within the annular groove 68 of the outer surface 62 of the inner joint 14. The seal 118 may be an o-ring seal that engages and seals between the outer surface 62 of the inner joint 14 and the inner surface 52 of the second flange 22. The seal 118 may prevent dust and other contaminants from entering the space between the inner joint 14 and the second flange 22 to protect the thrust bearings 84, 94, and 100. Further, the seal 118 may assist in retaining lubricant surrounding the thrust bearings 84, 94, and 100. The seal 118 allows the inner joint 14 and second flange 22 to rotate with respect to each other.

Referring to FIG. 6, the swivel joint 10 has two seals, a first seal 120 and a second seal 122, that seal between the inner joint 14 and the first flange 20 to prevent fluid flowing within the passageway 16 from leaking out between the inner joint 14 and the first flange 20. The first seal 120 is a primary seal that is positioned nearest to the passageway 16, and the second seal 122 is a backup seal that prevents fluid leakage in the event that the first seal 120 fails. The first seal 120 is positioned in an annular groove between the journal bearing race 76 and the sealing surface 74 of the inner joint 14. The first seal 120 seals between the sealing surface 74

(FIG. 8) of the inner joint 14, the sealing surface 34 (FIG. 6) of the first flange 20, and the journal bearing race 76. As shown, the first seal 120 is an o-ring seal. The first seal 120 may have an outer surface that is formed from a low friction material that allows the inner joint 14 and first flange 20 to rotate with respect to each other when a high pressure fluid flows through the passageway 16. For example, the outer surface of the first seal 120 may be formed from polytetrafluoroethylene (PTFE), perfluoroalkoxy (PFA), fluorinated ethylene propylene (FEP), or any other suitable material. The first seal 120 may have a fluoroelastomer or perfluourelastomer core (e.g., FKM, FFKM, or VITON fluoroelastomer) that is encapsulated by PTFE, PFA, or FEP, for example. The first seal 120 may be designed to effectively seal between the inner joint 14 and the first flange 20 when a fluid pressure in the passageway 16 is between approximately vacuum pressure to 15,000 psi. In particular, the first seal 120 may be operable to effectively seal between the inner joint 14 and the first flange 20 at both low fluid pressures and high fluid pressures. Although the first seal 120 is shown as an o-ring seal, the first seal 120 may be another suitable type of seal.

The second seal 122 is positioned within an annular groove formed in the bearing surface 36 of the first flange 20. The second seal 122 seals between the sealing surface 70 (FIG. 8) of the inner joint 14 and the bearing surface 36 of the first flange 20. As shown, the second seal 122 is an o-ring seal. The second seal 122 may have an outer surface that is formed from a low friction material that allows the inner joint 14 and first flange 20 to rotate with respect to each other when a high pressure fluid flows through the passageway 16. For example, the outer surface of the second seal 122 may be formed from PTFE, PFA, FEP, or any other suitable material. The second seal 122 may have a fluoroelastomer or perfluourelastomer core (e.g., FKM, FFKM, or VITON fluoroelastomer) that is encapsulated by PTFE, PFA, or FEP, for example. The second seal 122 may be designed to effectively seal between the inner joint 14 and the first flange 20 when fluid in the passageway 16 leaks around the first seal 120 to reach the second seal 122 and a fluid pressure in the passageway 16 is between approximately vacuum pressure to 15,000 psi. In particular, the second seal 122 may be operable to effectively seal between the inner joint 14 and the first flange 20 at both low fluid pressures and high fluid pressures. Although the second seal 122 is shown as an o-ring seal, the second seal 122 may be another suitable type of seal.

The journal bearing 78 assists in maintaining proper alignment of the first seal 120 and the second seal 122 with respect to the inner joint 14 and the first flange 20 to prevent leakage of fluid flowing through the passageway 16.

A leak indicator 132 is positioned between the first seal 120 and the second seal 122. The leak indicator 132 includes a housing 134 that is received by an opening 136 (FIG. 7) in the first flange 20. The housing 134 may threadingly engage a surface surrounding the opening 136 or be coupled to the first flange 20 in another suitable manner. A piston 138 is slidably received in the housing 134. The piston 138 is biased to a first position, shown in FIG. 6, by a spring 140 that is positioned between the piston 138 and the housing 134. The piston 138 is exposed to a chamber 142 defined by the first flange 20. The chamber 142 is in fluid communication with the space between the first flange 20 and the inner joint 14 from the first seal 120 to the second seal 122. If fluid from the passageway 16 flows around the first seal 120 into the chamber 142 (e.g., if the first seal 120 fails), the fluid forces the piston 138 radially outward away from the chamber 142 to a second position. The piston 138 compresses the spring 140 as it moves to the second position. When the piston 138 is in the first position shown in FIG. 6, it does not extend through an opening 144 of the housing 134. When the piston 138 moves to the second position, a portion of the piston 138 extends through the opening 144 of the housing 134 to provide a visual indicator that the first seal 120 is failing to effectively seal between the inner joint 14 and the first flange 20. If the first seal 120 fails, the second seal 122 prevents fluid from leaking out of the swivel joint 10. An operator who sees that the leak indicator 132 has activated may then take the swivel joint 10 out of service and replace the first seal 120 without any leakage of fluid outside of the swivel joint 10. The leak indicator 132 is a pressure indicator in that it reacts to pressure within the chamber 142 to move the piston 138.

The swivel joint 10 may be sized and configured for use with fluid distribution system conduits of any size. For example, it may be sized and configured for use with conduits having a Nominal Pipe Size (NPS) of 0.5", 0.75", 1", 1.25", 1.5", 2", 2.5", 3", 4", 6", 8", 10", 12", 14", 16", 18", 20", or 24", or Diameter Nominal (DN) of 15, 20, 25, 32, 40, 50, 65, 80, 100, 150, 200, 250, 300, 350, 400, 450, 500, or 600. The flange assembly 12 and inner joint 14 may be made from any suitable material, including carbon steel, stainless steel, or aluminum, and may be uncoated or coated by nickel plating, powder coating, or painting.

Figure 9:
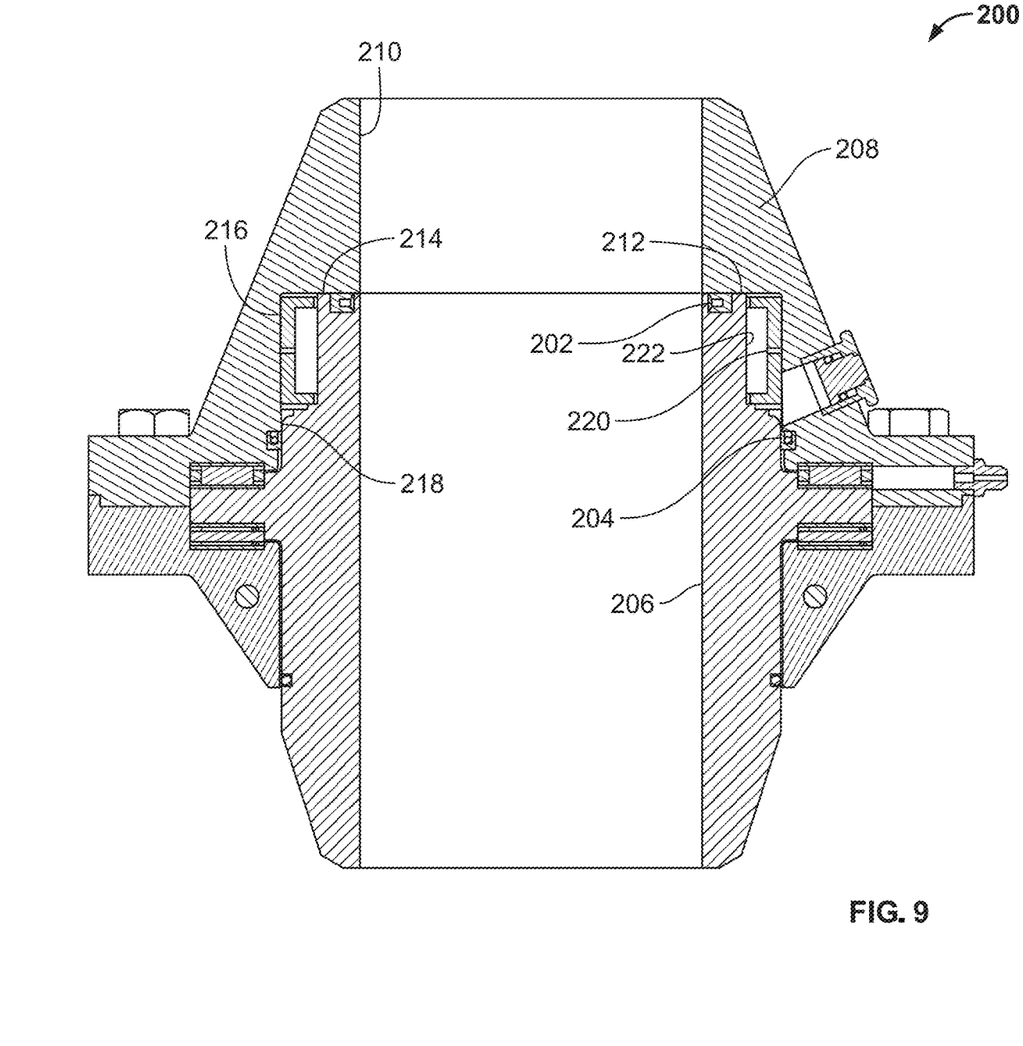
FIG. 9 is a cross-sectional view of an alternative embodiment of swivel joint in accordance with the invention described herein.

Referring to FIG. 9, an alternative embodiment of swivel joint 200 is shown. Swivel joint 200 is substantially similar to swivel joint 10 except for the differences described in detail below. Swivel joint 200 includes first and second seals 202 and 204 that are spring-energized seals, instead of the o-ring seals 120 and 122 described above in connection with swivel joint 10. The first and second seals 202 and 204 seal between the inner joint 206 and the first flange 208 to prevent fluid flowing within the passageway 210 from leaking out between the inner joint 206 and the first flange 208. The first seal 202 is a primary seal that is positioned nearest to the passageway 210, and the second seal 204 is a backup seal that prevents fluid leakage in the event that the first seal 202 fails. The first seal 202 is positioned within an annular groove at an upper surface 212 of the inner joint 206. The first seal 202 seals between the upper surface 212 of the inner joint 206 and the sealing surface 214 of the first flange 208. As shown, the first seal 202 is a spring-energized seal including a sealing material having a generally U-shaped cross-section and a spring or plurality of springs positioned within the sealing material. The spring or springs exert forces on the sealing material in directions toward the sealing surface 214 and the upper surface 212. The sealing material may be formed from a low friction material that allows the inner joint 206 and first flange 208 to rotate with respect to each other when a high pressure fluid flows through the passageway 210. For example, the sealing material may be formed from PTFE, PFA, FEP, or any other suitable material. The spring or springs may be formed from stainless steel or any other suitable material. The first seal 202 may be designed to effectively seal between the inner joint 206 and the first flange 208 when a fluid pressure in the passageway 210 is between approximately vacuum pressure to 15,000 psi. In particular, the first seal 202 may be operable to effectively seal between the inner joint 206 and the first flange 208 at both low fluid pressures and high fluid pressures. Although the first seal 202 is shown as a spring-energized seal, the first seal 202 may be another suitable type of seal.

The second seal 204 is positioned within an annular groove formed in the bearing surface 216 of the first flange 208. The second seal 204 seals between the sealing surface 218 of the inner joint 206 and the bearing surface 216 of the first flange 208. As shown, the second seal 204 is a spring-energized seal including a sealing material having a generally U-shaped cross-section and a spring or plurality of springs positioned within the sealing material. The spring or springs exert forces on the sealing material in directions toward the sealing surface 218 and the bearing surface 216. The sealing material may be formed from a low friction material that allows the inner joint 206 and first flange 208 to rotate with respect to each other when a high pressure fluid flows through the passageway 210. For example, the sealing material may be formed from PTFE, PFA, FEP, or any other suitable material. The spring or springs may be formed from stainless steel or any other suitable material. The second seal 204 may be designed to effectively seal between the inner joint 206 and the first flange 208 when fluid in the passageway 210 leaks around the first seal 202 to reach the second seal 204 and a fluid pressure in the passageway 210 is between approximately vacuum pressure to 15,000 psi. In particular, the second seal 204 may be operable to effectively seal between the inner joint 206 and the first flange 208 at both low fluid pressures and high fluid pressures. Although the second seal 204 is shown as a spring-energized seal, the second seal 204 may be another suitable type of seal.

Besides the differences in the first and second seals 202 and 204, the last difference between swivel joint 10 and swivel joint 200 is that swivel joint 200 does not have a journal bearing race between the journal bearing 220 and the inner joint 206. Instead, the journal bearing 220 is positioned in direct contact with the bearing surface 222 of the inner joint 206.

In operation, the first flange 20 and inner joint 14 are connected to conduits of a fluid distribution system in any suitable manner, as described above. As fluid flows through the passageway 16 between the openings 33 and 61, the flange assembly 12 and inner joint 14 may rotate with respect to each other about the central axis 18 permitting an operator to rotate the respective positions of the conduits connected to both ends of the swivel joint 10. The first seal 120 seals between the first flange 20 and inner joint 14 to prevent fluid from leaking out of the passageway 16. In the event that the first seal 120 fails and fluid enters the chamber 142, the second seal 122 seals the fluid from further advancing in the space between the first flange 20 and the inner joint 14 thereby preventing the fluid from leaking out of the swivel joint 10. Further, the fluid pressure in the chamber 142 activates the leak indicator 132 to provide a visual indication that the first seal 120 has failed. Before any fluid leaks out of the swivel joint 10, an operator seeing that the leak indicator 132 has activated may take the swivel joint 10 out of service and replace the first seal 120.

The split design of the second flange 22 (i.e., the first and second sections 40 and 42 shown in FIG. 8), and the split design of the second and third thrust bearings 94, 100, third and fourth washers 96, 98, and fifth and sixth washers 102, 104, allows an operator to more easily remove and replace the second and third thrust bearings 94, 100, third and fourth washers 96, 98, and fifth and sixth washers 102, 104. For example, the split design of these components allows an operator to remove the first and second sections 40 and 42 of the second flange 22, the second and third thrust bearings 94, 100, third and fourth washers 96, 98, and fifth and sixth washers 102, 104 by moving them away from the inner joint 14 in a direction perpendicular to the central axis 18. This allows an operator to remove these components for repair or replacement when a conduit is welded to the inner joint 14. If these components were not split into two parts, an operator would not be able to remove them without cutting the conduit welded to the inner joint 14. When the second flange 22 is unbolted from the first flange 20, an operator may further separate the first flange 20 from the inner joint 14 to repair or replace the first seal 120, second seal 122, journal bearing 78, first thrust bearing 84, or washers 86 and 88.

If an operator needs to remove and replace one of the seals 120 or 122, the operator also does not need to remove any of the bearings from the inner joint 14, i.e., the journal bearing 78, first thrust bearing 84, second thrust bearing 94, or third thrust bearing 100. The journal bearing 78, first thrust bearing 84, second thrust bearing 94, and third thrust bearing 100 may also be caged bearings as described above so that there are no loose ball bearings when removing the inner joint 14 from the flange assembly 12 for maintenance.

When used in a fluid distribution system, the swivel joint 10 may only cause the fluid to have a relatively minor drop in pressure as it passes through the swivel joint 10. As shown in FIG. 6, the passageway 16 has a constant diameter from the opening 33 to the opening 61 that does not change as the flange assembly 12 rotates with respect to the inner joint 14. If conduits of a fluid distribution system are welded to the first flange 20 and inner joint 14, the diameter of the passageway 16 may be substantially the same as the inner diameter of the conduits so that there is substantially unrestricted flow of fluid between the conduits and the passageway 16. The swivel joint 10 may be used in a fluid distribution system having fluids at a range of pressures from vacuum pressure to 15,000 psi, for example. Further, the swivel joint 10 may be used in a variety of different industries and applications, including, for example, the petroleum industry, chemical industry, construction industry, or any other suitable industry. The swivel joint 10 may also be used with a wide range of fluids, including petroleum products, water, chemicals, or any other type of suitable fluid. The swivel joint 200 operates in a substantially similar manner as the swivel joint 10 described above and has the same advantages.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A swivel joint comprising:
   a first flange;

a second flange that is secured to the first flange, the second flange comprising a first section and a second section that are removably coupled to each other;
an inner joint that is configured to rotate with respect to the first flange and the second flange, the inner joint comprising a main body and a radial extension extending outward from the main body, the radial extension positioned between the first flange and the second flange, wherein the main body of the inner joint and the first flange define a passageway configured to allow fluid to flow through it;
a first thrust bearing positioned between the radial extension and the first flange;
a second thrust bearing positioned between the radial extension and the first section of the second flange;
a third thrust bearing positioned between the radial extension and the second section of the second flange, wherein the second thrust bearing and the third thrust bearing are each semiannular;
a first washer positioned between the first thrust bearing and the first flange;
a second washer positioned between the first thrust bearing and the inner joint;
a third washer positioned between the second thrust bearing and the inner joint; and
a fourth washer positioned between the second thrust bearing and the second flange.

2. The swivel joint of claim 1, further comprising a journal bearing positioned between the main body of the inner joint and the first flange.

3. The swivel joint of claim 1, wherein the first thrust bearing comprises a plurality of spaced apart cylindrical rollers each supported by a cage, wherein the cylindrical rollers are oriented so that a longitudinal axis of each roller is positioned perpendicular to the passageway.

4. The swivel joint of claim 1, further comprising:
a first seal positioned between the first flange and the inner joint;
a second seal positioned between the first flange and the inner joint; and
a leak indicator positioned between the first seal and the second seal.

5. The swivel joint of claim 4, wherein the first seal comprises an o-ring seal with an outer surface comprising at least one of polytetrafluoroethylene, perfluoroalkoxy, or fluorinated ethylene propylene.

6. The swivel joint of claim 4, wherein the first seal and the second seal are configured so that the second seal is exposed to fluid flowing through the passageway when the first seal fails.

7. The swivel joint of claim 4, wherein the leak indicator comprises a housing coupled to the first flange and a piston slidably received in the housing, wherein the piston is biased to a first position, wherein the piston is exposed to a chamber positioned between the first seal and the second seal, and wherein the piston is configured to move from the first position to the second position when the first seal fails and fluid from the passageway enters the chamber.

8. A swivel joint comprising:
a flange assembly;
an inner joint that is configured to rotate with respect to the flange assembly, wherein the inner joint and the flange assembly define a passageway configured to allow fluid to flow through it;
a first seal positioned between the flange assembly and the inner joint;
a second seal positioned between the flange assembly and the inner joint;
a chamber defined by the flange assembly and in fluid communication with a space between the flange assembly and the inner joint from the first seal to the second seal; and
a leak indicator positioned between the first seal and the second seal and in fluid communication with the chamber, wherein the leak indicator comprises a housing coupled to the flange assembly and a piston slidably received in the housing, wherein the piston is biased to a first position, wherein the piston is exposed to the chamber, and wherein the piston is configured to move from the first position to a second position when the first seal fails and fluid from the passageway enters the chamber.

9. The swivel joint of claim 8, wherein the first seal comprises an o-ring seal with an outer surface comprising at least one of polytetrafluoroethylene, perfluoroalkoxy, or fluorinated ethylene propylene.

10. The swivel joint of claim 8, wherein the first seal and the second seal are configured so that the second seal is exposed to fluid flowing through the passageway when the first seal fails.

11. A swivel joint comprising:
a first flange;
a second flange that is secured to the first flange, the second flange comprising a first section and a second section that are removably coupled to each other;
an inner joint that is configured to rotate with respect to the first flange and the second flange, the inner joint comprising a main body and a radial extension extending outward from the main body, the radial extension positioned between the first flange and the second flange, wherein the main body of the inner joint and the first flange define a passageway configured to allow fluid to flow through it;
a first thrust bearing positioned between the radial extension and the first flange;
a second thrust bearing positioned between the radial extension and the first section of the second flange;
a third thrust bearing positioned between the radial extension and the second section of the second flange, wherein the second thrust bearing and the third thrust bearing are each semiannular; and
a journal bearing positioned between the main body of the inner joint and the first flange.

12. A swivel joint comprising:
a first flange;
a second flange that is secured to the first flange, the second flange comprising a first section and a second section that are removably coupled to each other;
an inner joint that is configured to rotate with respect to the first flange and the second flange, the inner joint comprising a main body and a radial extension extending outward from the main body, the radial extension positioned between the first flange and the second flange, wherein the main body of the inner joint and the first flange define a passageway configured to allow fluid to flow through it;
a first thrust bearing positioned between the radial extension and the first flange, wherein the first thrust bearing comprises a plurality of spaced apart cylindrical rollers each supported by a cage, wherein the cylindrical rollers are oriented so that a longitudinal axis of each roller is positioned perpendicular to the passageway;

a second thrust bearing positioned between the radial extension and the first section of the second flange; and a third thrust bearing positioned between the radial extension and the second section of the second flange, wherein the second thrust bearing and the third thrust bearing are each semiannular.

13. A swivel joint comprising:

a first flange;

a second flange that is secured to the first flange, the second flange comprising a first section and a second section that are removably coupled to each other;

an inner joint that is configured to rotate with respect to the first flange and the second flange, the inner joint comprising a main body and a radial extension extending outward from the main body, the radial extension positioned between the first flange and the second flange, wherein the main body of the inner joint and the first flange define a passageway configured to allow fluid to flow through it;

a first thrust bearing positioned between the radial extension and the first flange;

a second thrust bearing positioned between the radial extension and the first section of the second flange;

a third thrust bearing positioned between the radial extension and the second section of the second flange, wherein the second thrust bearing and the third thrust bearing are each semiannular;

a first seal positioned between the first flange and the inner joint;

a second seal positioned between the first flange and the inner joint; and a leak indicator positioned between the first seal and the second seal.

14. A swivel joint comprising:

a first flange;

a second flange that is secured to the first flange, the second flange comprising a first section and a second section that are removably coupled to each other;

an inner joint that is configured to rotate with respect to the first flange and the second flange, the inner joint comprising a main body and a radial extension extending outward from the main body, the radial extension positioned between the first flange and the second flange, wherein the main body of the inner joint and the first flange define a passageway configured to allow fluid to flow through it;

a first thrust bearing positioned between the radial extension and the first flange;

a second thrust bearing positioned between the radial extension and the first section of the second flange, wherein the second thrust bearing is parallel to the first thrust bearing; and a third thrust bearing positioned between the radial extension and the second section of the second flange, wherein the second thrust bearing and the third thrust bearing are each semiannular.

15. A swivel joint comprising:

a first flange;

a second flange that is secured to the first flange, the second flange comprising a first section and a second section that are removably coupled to each other;

an inner joint that is configured to rotate with respect to the first flange and the second flange, the inner joint comprising a main body and a radial extension extending outward from the main body, the radial extension positioned between the first flange and the second flange, wherein the main body of the inner joint has an inner surface that is aligned with an inner surface of the first flange, and wherein the aligned inner surfaces of the inner joint and the first flange define a passageway configured to allow fluid to flow through it;

a first thrust bearing positioned between the radial extension and the first flange;

a second thrust bearing positioned between the radial extension and the first section of the second flange; and a third thrust bearing positioned between the radial extension and the second section of the second flange, wherein the second thrust bearing and the third thrust bearing are each semiannular.

16. A swivel joint comprising:

a flange assembly comprising a first flange and a second flange that is secured to the first flange;

an inner joint that is configured to rotate with respect to the flange assembly;

a first seal positioned between the flange assembly and the inner joint;

a second seal positioned between the flange assembly and the inner joint;

a leak indicator positioned between the first seal and the second seal;

a first thrust bearing positioned between the inner joint and the first flange;

a second thrust bearing positioned between the inner joint and the second flange; and a journal bearing positioned between the inner joint and the first flange.

\* \* \* \* \*